US008558704B2

(12) United States Patent
Kim et al.

(10) Patent No.: US 8,558,704 B2
(45) Date of Patent: Oct. 15, 2013

(54) ALARM CONTROL APPARATUS AND METHOD USING FACE RECOGNITION

(75) Inventors: Kwan-Sic Kim, Yongin-si (KR); Kuen Shin, Yongin-si (KR); Seong-Phil Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 934 days.

(21) Appl. No.: 12/589,346

(22) Filed: Oct. 21, 2009

(65) Prior Publication Data

US 2010/0097227 A1 Apr. 22, 2010

(30) Foreign Application Priority Data

Oct. 21, 2008 (KR) ........................ 10-2008-0103249

(51) Int. Cl.
*G08B 23/00* (2006.01)
*G06K 9/00* (2006.01)

(52) U.S. Cl.
USPC ........ 340/576; 340/575; 340/573.1; 382/117; 382/118

(58) Field of Classification Search
None
See application file for complete search history.

(56) References Cited

U.S. PATENT DOCUMENTS

| | | | | |
|---|---|---|---|---|
| 4,228,806 A * | 10/1980 | Lidow | 600/544 |
| 5,745,038 A * | 4/1998 | Vance | 340/575 |
| 5,878,156 A * | 3/1999 | Okumura | 382/118 |
| 6,304,187 B1 * | 10/2001 | Pirim | 340/576 |
| 6,927,694 B1 * | 8/2005 | Smith et al. | 340/576 |
| 7,248,915 B2 * | 7/2007 | Ronnholm | 600/544 |
| 7,362,885 B2 * | 4/2008 | Hammoud | 382/117 |
| 7,948,387 B2 * | 5/2011 | Ishida et al. | 340/575 |
| 7,990,807 B2 * | 8/2011 | Li et al. | 368/73 |
| 8,184,008 B2 * | 5/2012 | Uozumi et al. | 340/576 |
| 2003/0080872 A1 * | 5/2003 | Gutta et al. | 340/691.3 |
| 2006/0056702 A1 * | 3/2006 | Tsunashima | 382/219 |
| 2007/0285396 A1 * | 12/2007 | Fu | 345/169 |
| 2008/0238694 A1 * | 10/2008 | Ishida | 340/575 |

* cited by examiner

*Primary Examiner* — George Bugg
*Assistant Examiner* — Renee Dorsey

(57) ABSTRACT

An alarm unit includes an apparatus and a method of maximizing the efficiency of an alarm function that wakes up a sleeping user. An image input unit capable of photographing an eye image as a criterion for determining if the user has woken up is mounted on an alarm control apparatus. The image input unit mounted alarm control apparatus photographs a face image of the user, detects the eye region from the face image, and then determines a state of whether the user has woken up or not based on movement of the pupils in the eye region. If it is determined that the user keeps a waking state for a certain time, an alarm function is cancelled. By doing this, the alarm unit can help prevent the user from easily cancelling an alarm and maximize the efficiency of an alarm function that wakes up a sleeping user.

26 Claims, 3 Drawing Sheets

ALARM CONTROL APPARATUS AND METHOD USING FACE RECOGNITION

CROSS-REFERENCE TO RELATED APPLICATION(S) AND CLAIM OF PRIORITY

The present application is related to and claims the benefit under 35 U.S.C. §119(a) of an application entitled "Alarm Control Apparatus and Method Using Face Recognition" filed in the Korean Industrial Property Office on Oct. 21, 2008 and assigned Serial No. 10-2008-0103249, the contents of which are hereby incorporated by reference.

TECHNICAL FIELD OF THE INVENTION

The present invention relates to an apparatus and a method of alarm control, and more particularly, to an apparatus and a method for preventing a user from unconsciously setting off an alarm and sleeping again.

BACKGROUND OF THE INVENTION

In an alarm generating method, a function of generating an alarm at a periodic time point each day can be applied to a general mobile communication terminal. In general, this is referred to as a morning call function. Such a morning call, including an alarm function, performs an operation of generating an alarm automatically at a corresponding time of each day even if each time a user does not input and set up an alarm time. Thus, in the case of a wake-up time and other functions that operate repeatedly every day, a mobile communication terminal receives an alarm time from the user once and generates an alarm repeatedly day after day when a corresponding time arrives. Therefore, the user's convenience is improved. That is, when an alarm function in the mobile communication terminal is set, the user can easily recognize the arrival of a specific time designated by himself, such as, for example, an appointment time, a wake-up time and a meeting time without a separate alarm apparatus.

In this alarm function, a user can finish the alarm function by simply pressing a button provided on an alarm apparatus. In the button-used alarm function finishing mode, despite its convenience, an instance can occur that a user sets off the alarm unintentionally and goes back to sleep. To prevent this instance, a snooze function that causes an alarm to go off several times after a certain time period has been implemented. However, the snooze function can be set free by using a key input such as an end key. Thus, when getting accustomed thereto to some degree, a user can cancel the snooze function without difficulty in his sleep like a normal alarm function.

SUMMARY OF THE INVENTION

To address the above-discussed deficiencies of the prior art, it is a primary object as described above, in the prior art alarm function, a user can go asleep again unintentionally by pressing an end button in his sleep when an alarm goes off. In that case, the alarm function does not work appropriately. Also, the cancellation of the prior art alarm function was performed in a limited and manual way through a user's key manipulation. In this regard, a method of waking up a user while permitting the user to cancel an alarm in order to faithfully perform the original function of an alarm is required. Also, in order to wake up the user, which is the major purpose of an alarm, a method of cancelling an alarm function in various ways other than a key input is provided.

Accordingly, the present invention provides an alarm control apparatus and method for waking up a user while requiring the user's concentration.

Also, the present invention provides an alarm control apparatus and method for cancelling an alarm function without a separate key input.

In accordance with an aspect of the present invention, there is provided an alarm control apparatus using a face recognition including: an image input unit configured to photograph a face image of a user, driven when an alarm is generated; an eye region detecting unit configured to detect an eye region from the face image input through the image input unit; an alarm control unit configured to generate an alarm when an alarm time arrives, the control unit configured determine if the eye region corresponding to an open-eyed state of the user has been detected through the eye region detecting unit for a predefined time, and the control unit further configured to pause the alarm generation when it has been detected for the predefined time as a determination result; and an alarm generating unit configured to generate an alarm under the control of the alarm control unit.

In accordance with another aspect of the present invention, there is provided an alarm control method using a face recognition including the steps of: generating an alarm when an alarm time arrives; photographing a face image of a user when the alarm is generated and discovering an eye region from the photographed face image; determining if the eye region corresponding to an open-eyed state of the user has been detected for a predefined time; and pausing the alarm generation when it has been detected for the predefined time as a determination result.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

The present invention proposes a method of maximizing efficiency of an alarm function that wakes up a user. To this end, the present invention mounts an image input unit capable of photographing an eye image on an alarm control apparatus, wherein the eye image is used as a criterion for determining if a user has woken up. The image input unit mounting alarm control apparatus photographs a face image of a user. The image input unit mounting alarm control apparatus also detects an eye region from the face image and determines a state of whether the user has woken up or not based on movement of the pupil in the eye region. If it is determined that the user keeps a waking state for a certain time, the alarm function is cancelled. By doing this, the present invention prevents the user from cancelling an alarm easily and at the same time, maximizes efficiency of the alarm function that wakes up the user.

Figure 1:
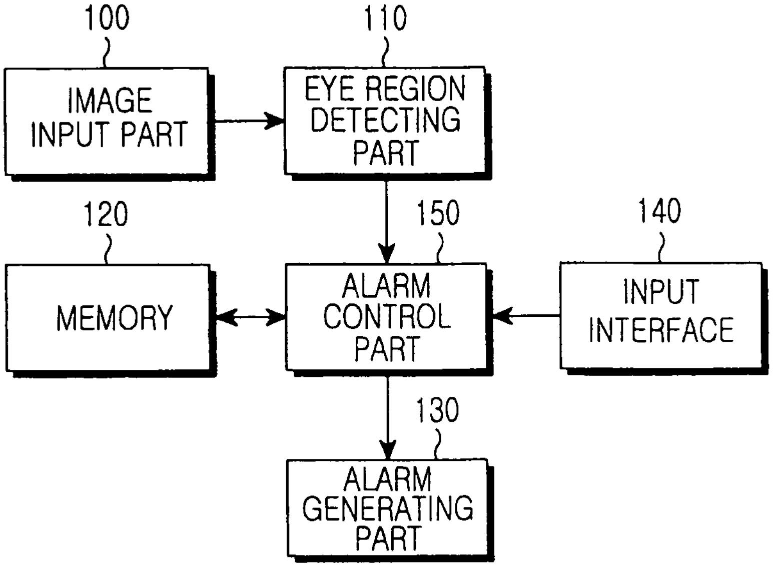
FIG. 1 illustrates an internal block diagram of an alarm control apparatus according to an embodiment of the present invention.

In the following, the construction and operation of an alarm control apparatus carrying out the above-mentioned functions will be described with reference to FIG. 1. FIG. 1 is an internal block diagram of an alarm control apparatus according to an embodiment of the present invention.

Referring to FIG. 1, the alarm control apparatus includes an image input unit 100, an eye region detecting unit 110, a memory 120, an alarm generating unit 130, an input interface 140 and an alarm control unit 150.

First, the image input unit 100 refers to a means for photographing an object, which is mounted on the alarm control apparatus, and one example is a camera. The image input unit 100 can take a continuous shooting of a user's face to obtain a still image of the user face while an alarm is generated.

The eye region detecting unit 110 can recognize a face region from an image input through the image input unit 100 and then can detect an eye region in the face region. As a method of recognizing a face region from an input image, a face region extracting algorithm can be used. For example, a template matching method, which includes configuring the template of a user face in advance and scanning and matching all areas of the image by the size-control from a minimum size to a maximum size, a skin color using method, and other various methods can be employed.

According to the first embodiment of the present invention, it is possible to store a photographed user's face image in advance and determine the face region and the eye region by using a comparison result of an image photographed at the time of an alarm generation to the stored image as the face region extracting algorithm. Another embodiment of the present invention can determine the face region and the eye region by using a difference image between continuous still images as the face region extracting algorithm.

Figure 2:
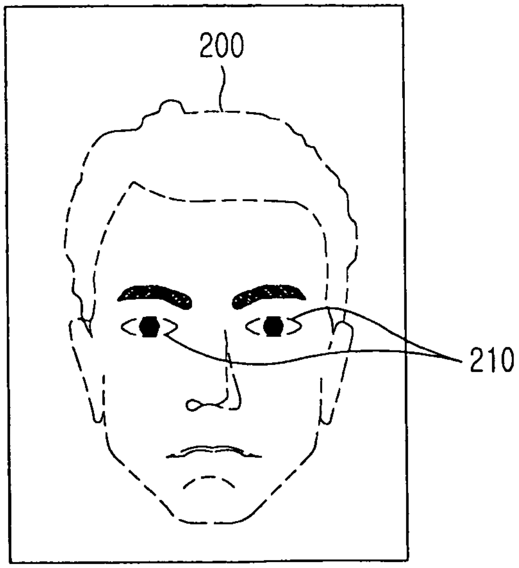
FIG. 2 illustrates an exemplary diagram of a face image used in the present invention.

To describe this, reference will be made to FIG. 2 representing a face region 200 of a user photographed beforehand. As shown in FIG. 2, it is understood that the position of the eye region 210 in the face region 200 does not change. Thus, the position of the eye region 210 can be obtained by comparing between an input image and a photographed image as long as the face region is recognized from the input image at the time of an alarm generation. In the following description, the aforementioned face region extracting algorithms will be described by way of an example. However, the present invention is not limited to these algorithms, but other face region extracting algorithms can be used.

The memory 120 includes a ROM (Read Only Memory), a RAM (Random Access Memory) and the like for storing a multiple of programs and data. Also, the memory 120 stores alarm setting-related information, such as, for example, an alarm date and an alarm hour and alarm cancel-related information, that is criteria information for determining a state of the user's waking up, for example, a duration time the user should open his eyes and a varying degree of an eye region image that can determine that the user keeps the eyes open. Also, the memory 120 stores a face image of the user or an eye region image of the user necessary for determining a state that the user opens his eyes according to the present invention.

The alarm generating unit 130 can output an alarm sound through a speaker under the control of the alarm control unit 150.

The input interface 140 can includes a keypad, or the like, and can include a functional key for interfacing with the user and the like. Such an input interface is an input means for alarm cancellation information as well as alarm setting information including an alarm time, alarm repeat times, and the like.

The alarm control unit 150 can control all components of the alarm control apparatus, and in particular, the alarm control unit 150 can determine whether to cancel an alarm or not by using the eye region image detected through the eye region detection unit 110 according to an embodiment of the present invention. In other words, the alarm control unit 150 determines if the eye region corresponding to a state that the user opens the eyes has been detected for a predefined time, and pauses an alarm generation when it is detected for the predefined time.

First, the alarm control unit 150 measures variation between eye region images detected through the eye region detection unit 110 for the predefined time to determine a state that the user keeps the eyes open. If the degree of variation is within a preset value, the alarm control unit 150 determines that the eyes of the user continuously are open. In this case, it is determined that the user stays awake and thus the alarm generation is paused. That is, the alarm control unit 150 determines if the eye region corresponding to a state that the user opens his eyes has been detected by measuring a varying degree between the eye regions detected through the eye region detection unit 110.

Otherwise, if the varying degree for the predefined time exceeds a preset value, the alarm control unit 150 determines that the user may not have woken up. In this case, an alarm generation continues. Here, a method of detecting an eye region in a face image uses a face region detection algorithm as described above, and, in order to measure a varying degree between eye region images, the following approaches may be used. For example, a difference image between continuously photographed two eye region images can be used, or a dimension comparison mode between two eye regions in the previously stored eye region image of the user and the eye region image of a photographed face image can be used. Here, the previously stored eye region image of the user, which can be used as a basis, refers to an image photographed in advance in a state wherein the eyes of the user are open.

When an eye region image corresponding to a state wherein user's eyes are open for a predefined time has been detected through these approaches, the alarm control unit 150 determines it as corresponding to an alarm control and causes the alarm generation unit 130 to pause an alarm generation.

Additionally, the present invention further has an option function, requiring a user's concentration in case that the user keeps his eyes open only for a predefined time and then closes the eyes, so as to maximize the efficiency of an alarm function. Thus, after determining that the user has held his eyes open for a certain time, the alarm control unit 150 outputs a screen that requires the user to perform a 'follow function'. For example, if a follow quiz requiring the input of a character, a number, a word, or the like, is output on the screen, the alarm control unit 150 determines the cancellation of an alarm generation, or not, by receiving the corresponding character, number, word, or the like from the user through the input interface 140 and comparing them. If they are equal by a comparison result, the alarm control unit 150 can pause the alarm generation and, at substantially the same time, output a success congratulation message.

Figure 3:
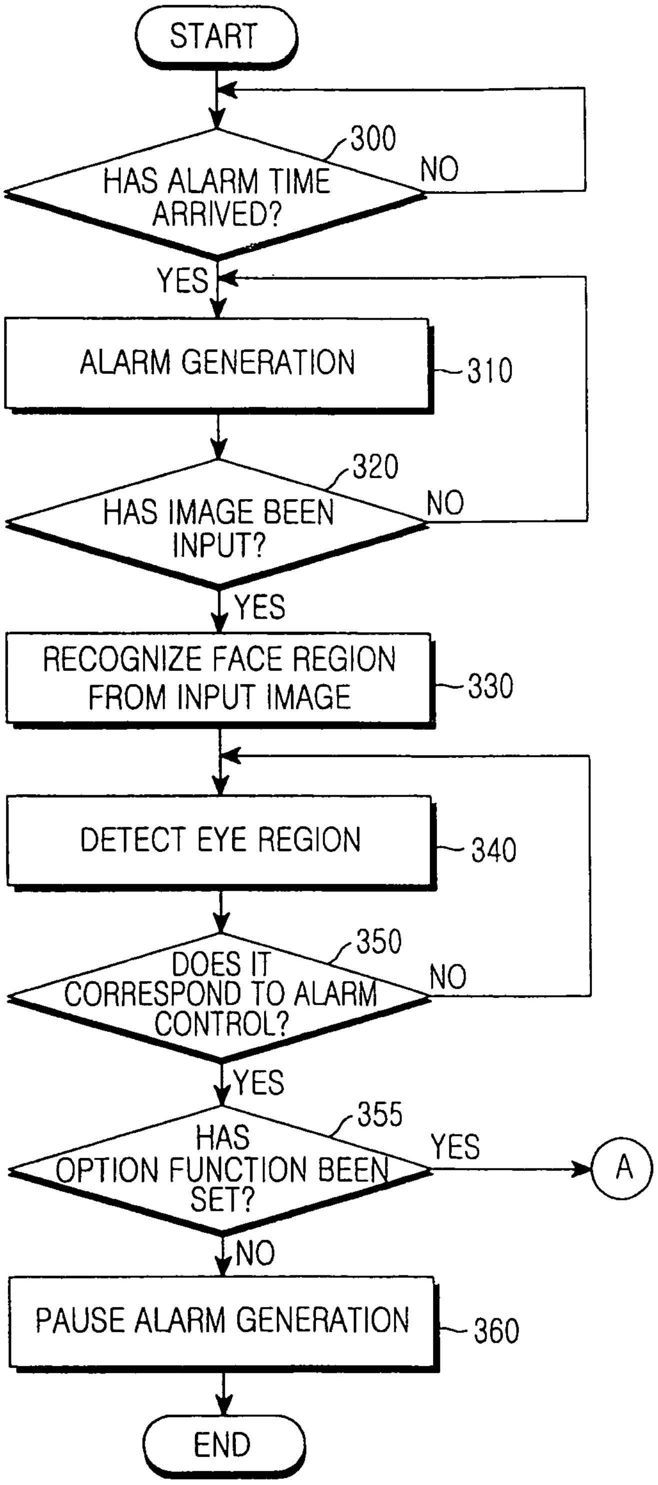
FIG. 3 and FIG. 4 illustrate flow diagrams of an operation in an alarm control apparatus using a face recognition according to an embodiment of the present invention.
Figure 4:
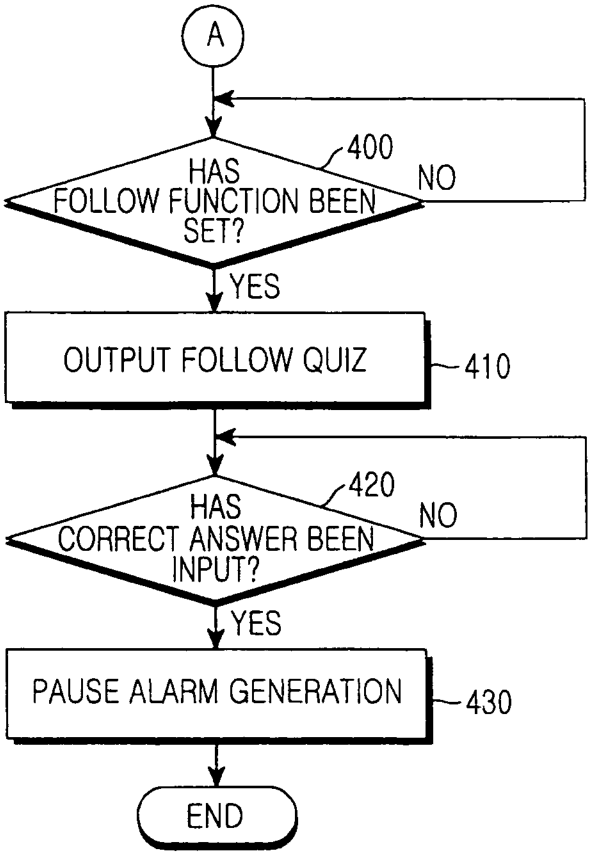

FIG. 3 illustrates a flow diagram for an operation in an alarm control apparatus using a face recognition according to an embodiment of the present invention. When a user sets an alarm, the user can set which mode to use from a general alarm mode and a face recognition alarm mode in advance. FIG. 3 describes a case in which a face recognition alarm mode is set.

Referring to FIG. 3, the alarm control apparatus determines if an alarm time set by a user has arrived in step 300. When the alarm time has arrived as a determination result, an alarm is generated in step 310. At this time, the alarm control apparatus drives the image input unit 100 automatically if the face recognition alarm mode is set. Then, the alarm control apparatus determines if the image of the user is being input through the image input unit 100 in step 320. If the user takes a photograph of his face through the image input unit 100, the alarm control apparatus recognizes a face region from the image input through the photographing in step 330, and detects an eye region in the recognized face region in step 340.

Here, the face region can be detected from the input image by comparing and analyzing the photographed face image of the user and a previously stored face image of the user to recognize the face region. Because the position of the eye region is fixed, the face region and the eye region are detected at the same time. Alternatively, a face region and an eye region detecting mode using a difference image between continuously photographed images can be employed. However, the present invention is not limited on the aforementioned modes, but other similar face region and eye region detecting technologies can be used.

As such, when the eye region is detected, the alarm control apparatus determines if it corresponds to an alarm control in step 350. Specifically, if the detected eye image is an image corresponding to a state that the user opens his eyes and that image is continuously received for a predefined time, the alarm control apparatus determines that the user has woken up. That is, the alarm control apparatus determines that a user's open-eyed image corresponding to the alarm control has been input.

When it corresponds to the alarm control, the alarm control apparatus determines if an option function has been set in step 355. When the option function is set, the method proceeds to step 400 in the control flow of FIG. 4. Here, a symbol 'A' is used to indicate that step 355 and step 400 are connected. This option function refers to a function for preparing for a user to keep his eyes open only for the time for an alarm cancellation and then close the eyes, and it requires the user's additional concentration. If the option function is not set, the alarm generating apparatus only checks a state that the user opens his eyes or not. And if it is an open-eyed state corresponding to the alarm control, the method proceeds to step 360 and pauses the alarm generation.

Otherwise, when an option function is set, the alarm control apparatus determines if a follow function, that is one of option functions, has been set in step 400. As a determination result, when the follow function is set, the method outputs a follow quiz on the screen in step 410. When only a correct answer is input in step 420, the method pauses the alarm generation in step 430.

As described above, the present invention can keep a user from unintentionally setting off an alarm in his sleep because the user has to look at a camera with his two eyes open. Additionally, the present invention can prevent a user from readily cancelling an alarm and force the user to open his eyes for a predefined time, so as to maximize the efficiency of an alarm function that wakes up the sleeping user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An alarm control apparatus using a face recognition, the alarm control apparatus comprising:

an image input unit configured to photograph a face image of a user, driven when an alarm is generated;

an eye region detecting unit configured to detect an eye region from the face image input through the image input unit during a generation of the alarm;

an alarm control unit configured to cause the generation of the alarm when an alarm time arrives, wherein the alarm control unit further is configured to determine if the eye region corresponding to an open-eyed state of the user has been detected through the eye region detecting unit during a predefined time, and pause the alarm generation when the open-eyed state has been maintained during the predefined time; and an alarm generating unit configured to generate an alarm under the control of the alarm control unit.

2. The alarm control apparatus of claim 1, further comprising a memory configured to store alarm setting-related information, the predefined time indicative of a duration time that the user should open the user's eyes, and an image photographing the user's face.

3. The alarm control apparatus of claim 2, wherein the eye region detecting unit is configured to detect the eye region by comparing the stored image with an image photographed at the time of the alarm generation.

4. The alarm control apparatus of claim 2, wherein the eye region detecting unit is configured to detect the eye region using a difference image between two images continuously photographed at the time of the alarm generation.

5. The alarm control apparatus of claim 1, wherein to determine if the eye region corresponds to the open-eyed state, the alarm control unit is configured to determine, after detecting that eyes of the user have been opened, whether a degree of variation for a difference between eye regions of successive images does not exceed a preset value of variation during the predetermined period of time.

6. The alarm control apparatus of claim 1, wherein the alarm control unit is configured to determine whether an option function is set during the generation of the alarm, output a screen requiring input of a predetermined number or word when the option function is set, determine if a number or word input by the user is not equal to a predetermined number or word, and maintain the generation of the alarm when the number or word input by the user is not equal to the predetermined number or word.

7. The alarm control apparatus of claim 1, wherein to pause the alarm generation, the alarm control unit is configured to output a screen requiring a character input from the user in response to determining that the open-eyed state of the user has been detected through the eye region detecting unit during the predefined time, and pause the alarm generation when a character input by the user is equal to a predetermined character.

8. An alarm control method using a face recognition in an alarm control apparatus, the alarm control method comprising:

generating an alarm when an alarm time arrives;

photographing a face image of a user when the alarm is generated and detecting an eye region from the photographed face image;

determining if the eye region corresponding to an open-eyed state of the user has been detected during a predefined time; and pausing the alarm generation when the open-eyed state has been maintained during the predefined time.

9. The alarm control method of claim 8, wherein detecting the eye region comprises the step of detecting the eye region by comparing a previously stored face image of the user with a face image photographed at the time of the alarm generation.

10. The alarm control method of claim 8, wherein detecting the eye region comprises the step of detecting the eye region using a difference image between two images continuously photographed at the time of the alarm generation.

11. The alarm control method of claim 8, wherein determining if the eye region corresponds to the open-eyed state of the user comprises determining, after detecting that the eyes of the user have been opened, whether by a degree of variation for a difference between eye regions of successive images does not exceed a preset value of variation during the predetermined period of time.

12. The alarm control method of claim 8, wherein pausing the alarm generation comprises:

determining if an option function has been set;

outputting a screen requiring a character input from the user when the option function is set; and pausing the alarm generation when a character input by the user is equal to a predetermined character.

13. The method of claim 8, further comprising storing alarm setting-related information, the predefined time indicative of a duration time that the user should open the user's eyes, and an image photographing the user's face.

14. An alarm system for waking a user, the alarm system comprising:

an input interface, configured to receive inputs from a user, the input interface adapted to enable a user to enter a desired alarm time and a predefined time indicative of a duration time that the user should open the user's eyes;

an image input unit configured to photograph a face image of a user, driven when the alarm is generated;

an eye region detecting unit configured to detect an eye region from the face image input through the image input unit;

an alarm control unit configured to cause an alarm generating unit to generate the alarm when the alarm time arrives, wherein the alarm control unit further is configured to determine if the eye region corresponding to an open-eyed state of the user has been detected through the eye region detecting unit during the predefined time, and pause the alarm generation when the open-eyed state has been maintained during the predefined time; and the alarm generating unit configured to generate the alarm under the control of the alarm control unit, the alarm generating unit configured to cause the alarm to sound.

15. The alarm system of claim 14, further comprising a memory configured to store alarm setting-related information, the predefined time indicative of a duration time that the user should open the user's eyes, and an image photographing the user's face.

16. The alarm system of claim 15, wherein the eye region detecting unit is configured to detect the eye region by comparing the stored image with an image photographed at the time of the alarm generation.

17. The alarm system of claim 15, wherein the eye region detecting unit is configured to detect the eye region using a difference image between two images continuously photographed at the time of the alarm generation.

18. The alarm system of claim 14, wherein to determine whether the eye region corresponds to the open-eyed state, the alarm control unit is configured to determine, after detecting that eyes of the user have been opened, whether a degree of variation for a difference between eye regions of successive images does not exceed a preset value of variation during the predetermined period of time.

19. The alarm system of claim 14, wherein the alarm control unit is configured to determine whether an option function is set during the generation of the alarm, output a screen requiring input of a predefined number or word when the option function is set, determine whether a number or word input by the user is not equal to the predetermined number or word, and maintain the generation of the alarm when the number or word input by the user is not equal to the predetermined number or word.

20. The alarm system of claim 14, wherein to pause the alarm generation, the alarm control unit is configured to output a screen requiring a character input from the user in response to determining that the open-eyed state of the user has been detected through the eye region detecting unit for the predefined time, and pause the alarm generation when a character input by the user is equal to a predetermined character.

21. The alarm control apparatus of claim 1, wherein the alarm control unit is configured to maintain the alarm generation when the open-eyed state has not been maintained during the predefined time.

22. The alarm control method of claim 8, further comprising maintaining the alarm generation when the open-eyed state has not been maintained during the predefined time.

23. The alarm system of claim 14, wherein the alarm control unit is configured to maintain the alarm generation when the open-eyed state has not been maintained during the predefined time.

24. A mobile communication terminal comprising:

an image input unit configured to capture a face image of a user;

an input unit configured to receive a user input;

a display configured to output information associated with an application; and a controller configured to:

detect an eye region from the captured face image input through the image input unit while running the application and cause the application to be maintained or interrupted based on whether the eye region has been detected to be an open-eyed state for a predefined time, and receive the user input received while running the application and cause the application to be interrupted in response to the user input.

25. An alarm control method in a mobile communication terminal, the method comprising:

capturing a face image of a user while running an application;

detecting an eye region from the captured face image;

causing the application to be maintained or interrupted depending on whether the eye region has been detected to be an open-eyed state for a predefined time; and causing the application to be interrupted in response to a user input when the user input is received while running the application.

26. A non-transitory machine-readable storage medium embodying a program for an alarm control method, the program comprising program code for:

capturing a face image of a user while running an application;

detecting an eye region from the captured face image;

causing the application to be maintained or interrupted depending on whether the eye region has been detected to be an open-eyed state for a predefined time; and causing the application to be interrupted in response to a user input when the user input is received while running the application.

* * * * *